United States Patent Office.

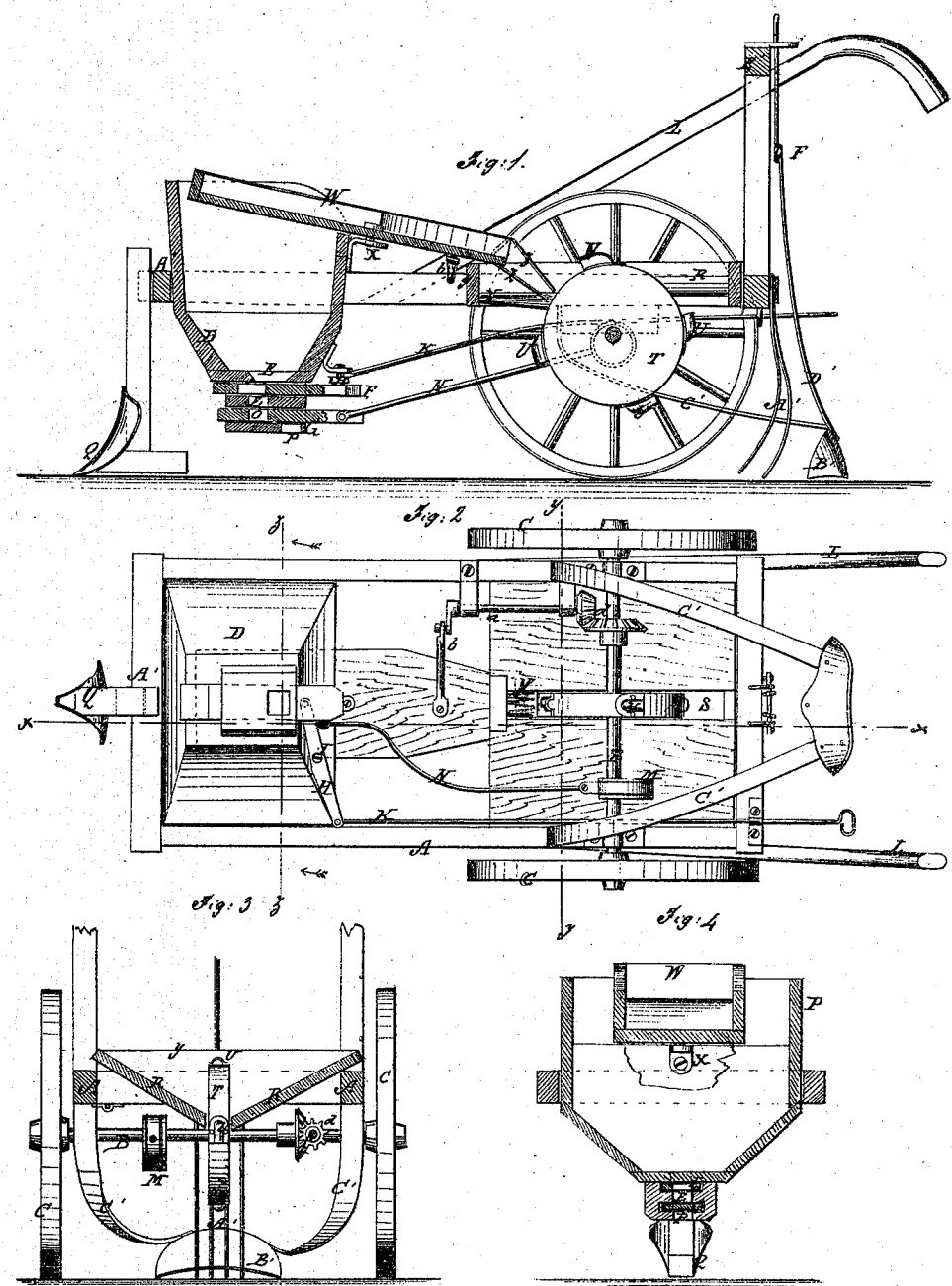

LOUIS A. PERRAULT, OF NATCHEZ, MISSISSIPPI, ASSIGNOR TO HIMSELF AND JOSEPH HUBER, OF SAME PLACE.

Letters Patent No. 112,486, dated March 7, 1871.

IMPROVEMENT IN COMBINED COTTON AND CORN-PLANTERS.

The Schedule referred to in these Letters Patent and making part of the same.

*To all whom it may concern:*

Be it known that I, LOUIS A. PERRAULT, of Natchez, in the county of Adams and State of Mississippi, have invented a new and improved Combined Cotton and Corn-Planter; and I do hereby declare that the following is a full, clear, and exact description thereof, which will enable others skilled in the art to make and use the same, reference being had to the accompanying drawing forming part of this specification.

This invention relates to improvements in machinery for planting seed, and consists in a combination in one machine of a seed-dropping apparatus adapted for corn, and another adapted for cotton, in a manner to utilize one running-gear for the two kinds of seed and thereby save the expense of separate gear for each.

The invention also comprises improvements in the construction and arrangement of the apparatus for each.

Figure 1 is a longitudinal sectional elevation of my improved machine;

Figure 2 is a plan view;

Figure 3 is a transverse section on the line $y\ y$ of fig. 2; and

Figure 4 is a section on the line $z\ z$.

Similar letters of reference indicate corresponding parts.

A represents a rectangular frame, mounted on an axle, B, of a pair of wheels, C, which are keyed fast to said axle.

Near the front of the frame is mounted a corn-hopper, D, having a discharge-opening, E, at the bottom, extending to the dropper-slide, a cut-off slide, F, and a dropping-slide, G.

The cut-off slide is jointed to a lever, H, pivoted at I, and connected to the long rod K, extending rearward to a point below one of the handles L, where it can be conveniently reached by the attendant for closing or opening, as may be required.

The dropping-slide is arranged below the slide F, and is worked by the eccentric M on shaft B, to which it is connected by the rod N.

This slide has a hole, O, into which the corn falls when slide F is open, and is carried back to the hole P at the rear of hole E, and extending from the dropper-slide through the bottom of the hopper.

In front of this hopper is a cultivator-shaped drill-opener, Q, suspended from the frame and made adjustable up or down, for varying the depth of the drill, by sliding in a groove in beam A' of the frame; or it may be any other arrangement.

R is the cotton-seed hopper, mounted over the axle, and having a long slot, S, at the bottom of the two oblique slides, in which works a disk, T, mounted on the shaft, and having the cup-shaped discharger U arranged at suitable equal distances from each other on the periphery.

In front of this disk the slot S is stopped by the strong bristles V, or other suitable material, made fast at the end of the slot, and projecting toward and against the periphery of the disk, so as to be forced down by the cups and discharge a small quantity of seed as each cup passes.

As the cotton-seed is very liable to clog, I have provided a shoe, W, above this hopper, to receive the seed and discharge it into said hopper in a continuous and regular stream.

Said shoe is pivoted at $x$ to the corn-hopper, and rests at the discharging end, which is lowest, on the end $y$ of hopper R.

This end is provided with stirring-arms, Z, projecting downward into the hopper, and it is vibrated to cause the discharge of the seed from it, and the agitation of it in the hopper below.

For vibrating it a crank-shaft, $a$, pitman-rod, $b$, and pair of beveled wheels, $d$, are provided and arranged, as shown, one wheel being on shaft B, the other on shaft $a$, and the connecting-rod attached at one end to the hopper and at the other to the crank of shaft $a$, which is arranged parallel with the longitudinal axis of the shoe.

A' represents a set of fingers mounted at the rear end of the frame, and projecting downward therefrom to the ground, for raking the earth and the seed together and assisting in covering it.

Behind these fingers is a covering-scraper, B', suspended by spring or hinged bar, C', which will admit of the scraper being raised off the ground to pass over clods or for turning around corners.

D' is a rod attached to the scraper, for lifting it, and extending upward past the rear elevated beam E', and suitably arranged to be connected to it, for holding the scraper up.

In this instance an eye, F', is provided, by which it is suspended on a pin inserted in a hole in the beam E'.

By these arrangements I am enabled to utilize the truck, drill-opener, and covering devices, which are applicable alike for corn or cotton planting, for both uses, and thereby save the expense of another set of these devices, which would be required if complete machines for each purpose were used.

Having thus described my invention,

I claim as new and desire to secure by Letters Patent—

1. The arrangement, with one truck, drill-opener, and covering-scraper, of a corn-planting hopper, dropping-slide, and the operating devices therefor; also, the cotton-dropping devices, consisting of the vibrating shoe W, hopper R, cupped disk T, and the bristles V, all substantially as specified.

2. The corn-hopper D, cut-off slide F, lever H, rod K, dropper-slide G, eccentric M, rod N, all arranged substantially as specified.

3. The cotton-hopper R, cupped disk T, bristles V, and vibrating shoe W, all combined and arranged substantially as specified.

The above specification of my invention signed by me this 6th day of October, 1870.

LOUIS A. PERRAULT.

Witnesses:
 GEO. W. MABEE,
 ALEX. F. ROBERTS.